(12) United States Patent
Wang

(10) Patent No.: US 11,018,500 B2
(45) Date of Patent: May 25, 2021

(54) CURRENT-LIMITING CIRCUIT, CURRENT-LIMITING DEVICE AND DISPLAY DEVICE

(71) Applicants: CHONGQING HKC OPTOELECTRONICS TECHNOLOGY CO., LTD., Chongqing (CN); HKC CORPORATION LIMITED, Guangdong (CN)

(72) Inventor: Mingliang Wang, Chongqing (CN)

(73) Assignees: CHONGQING HKC OPTOELECTRONICS TECHNOLOGY CO., LTD., Chongqing (CN); HKC CORPORATION LIMITED, Guangdong (CN)

( * ) Notice: Subject to any disclaimer, the term of this patent is extended or adjusted under 35 U.S.C. 154(b) by 245 days.

(21) Appl. No.: 16/311,736

(22) PCT Filed: Oct. 23, 2018

(86) PCT No.: PCT/CN2018/111484
§ 371 (c)(1),
(2) Date: Dec. 20, 2018

(87) PCT Pub. No.: WO2020/042309
PCT Pub. Date: Mar. 5, 2020

(65) Prior Publication Data
US 2020/0076186 A1     Mar. 5, 2020

(30) Foreign Application Priority Data

Aug. 31, 2018  (CN) .......................... 201811012965.7
Aug. 31, 2018  (CN) .......................... 201821431391.2

(51) Int. Cl.
H02H 9/02      (2006.01)
G09G 3/36      (2006.01)
G09G 3/20      (2006.01)

(52) U.S. Cl.
CPC ............. *H02H 9/02* (2013.01); *G09G 3/2092* (2013.01); *G09G 3/3648* (2013.01)

(58) Field of Classification Search
CPC   H02H 9/02; H02H 9/00; H02H 9/023; H02H 9/025; G09G 3/2092; G09G 3/3648
See application file for complete search history.

(56) References Cited

U.S. PATENT DOCUMENTS 8,502,459 B2      8/2013   Son et al.
2011/0266962 A1   11/2011  Son et al.
(Continued)

FOREIGN PATENT DOCUMENTS

CN    103118204 A    5/2013
CN    103580260 A    2/2014
(Continued)

OTHER PUBLICATIONS

CN103580260A Portable mobile power supply, English translation, 2014 (Year: 2014).*
(Continued)

*Primary Examiner* — Adolf D Berhane
(74) *Attorney, Agent, or Firm* — Westbridge IP LLC (57) ABSTRACT

Embodiments of the present disclosure provide a current-limiting circuit, a current-limiting device and a display device. A current detection circuit outputs a first voltage signal according to a first current signal output from a power management IC, and a current-limiting setting circuit outputs a second current signal for current-limiting control of a current output signal of a boost chip according to the first voltage signal.

18 Claims, 3 Drawing Sheets

(56) References Cited

U.S. PATENT DOCUMENTS

2015/0027466 A1* 1/2015 Xiang ............... H02J 7/342
    131/329
2018/0309286 A1* 10/2018 Kaundinya ............ H02H 9/04
2020/0136377 A1* 4/2020 Wang ................. G02F 1/1333

FOREIGN PATENT DOCUMENTS

| CN | 205986280 U | 2/2017 |
|---|---|---|
| CN | 206542179 U | 10/2017 |
| CN | 207518263 U | 6/2018 |

OTHER PUBLICATIONS

International Search Report, dated Apr. 4, 2019, for Chongqing HKC Optoelectronics Technology Co., Ltd. et al., International Application No. PCT/CN2018/111484, filed Oct. 23, 2018.
Chinese Office Action, dated Apr. 24, 2019, for Chongqing HKC Optoelectronics Technology Co., Ltd. and HKC Corporation Limited, Chinese Application No. 201811012965.7, filed Aug. 31, 2018.

* cited by examiner

CURRENT-LIMITING CIRCUIT, CURRENT-LIMITING DEVICE AND DISPLAY DEVICE

CROSS-REFERENCES TO RELATED APPLICATION

This application is the International Application No. PCT/CN2018/111484 for entry into US national phase with an international filing date of Oct. 23, 2018 designating US, now pending, and claims priority to Chinese Patent Application 201811012965.7, filed on Aug. 31, 2018, the content of which is incorporated herein by reference in its entirety.

BACKGROUND OF THE APPLICATION

Field of the Invention

The present disclosure relate to the field of electronic technologies, and in particular, to a current-limiting circuit, a current-limiting device, and a display device.

Description of Related Art

In the liquid crystal display panel the gate driving chip is usually integrated on the display panel. This design method greatly limits the reduction of the frame of the display. In order to reduce the frame of the display, the existing display usually adopts the gate driver less (GDL) architecture. In a GDL circuit, a gate driver chip is divided into a boost chip and a shift register chip, the boost chip is integrated on the driver board, and the shift register chip is integrated on the display panel. The driving of the display is implemented by the boost chip outputting a high voltage logic signal to the shift register chip, so that the length of the frame can be further reduced. Due to the uncontrollable factors in the production process, the display panel may be abnormally operated. In order to avoid the output current of the boost chip and the power management IC being too large so as to burn out the display panel, protection mechanisms are usually set for the boost chip and the power management IC. By this mechanism, the current output of the boost chip is turned off when the current signal output from the boost chip is too large, or the current output of the power management IC is turned off when the current signal output from the power management IC is too large.

However, because the overcurrent protection circuits used by the boost chip and the power management IC often cannot turn off the corresponding current outputs in time, the panel burnout occurs, which has great security risks.

BRIEF SUMMARY OF THE INVENTION

Because the overcurrent protection circuits used by the boost chip and the power management IC often cannot turn off the corresponding current outputs in time, the panel burnout occurs, which has great security risks.

Embodiments of the present disclosure provides a current-limiting circuit, a current-limiting device, and a display device, which are intended to solve the problem that because the overcurrent protection circuits used by the boost chip and the power management IC often cannot turn off the corresponding current outputs in time, the panel burnout occurs, which has great security risks.

According to an embodiment of the present disclosure, a current-limiting circuit configured to be coupled to a boost chip and a power management IC comprises:

a current detection circuit configured to receive a first current signal output from the power management IC and convert the first current signal into a corresponding first voltage signal, wherein the current detection circuit is coupled to the power management IC; and a current-limiting setting circuit configured to receive the first voltage signal and output a second current signal for current-limiting control of a current output signal of the boost chip, wherein the current-limiting setting circuit is coupled to the current detection circuit and the boost chip.

In an embodiment, the boost chip comprises:

an internal current-limiting setting circuit configured to control the boost chip to stop outputting the current output signal in the case that the current output signal is greater than or equal to an internal current-limiting setting value.

In an embodiment, the current detection circuit comprises:

a current detector configured to detect the first current signal and output a first detection voltage signal and a second detection voltage signal according to the first current signal, wherein the current detector is coupled to the power management IC; and an operational amplification circuit configured to receive the first detection voltage signal and the second detection voltage signal and output the first voltage signal according to the first detection voltage signal and the second detection voltage signal, wherein the operational amplification circuit is coupled to the current detector.

In an embodiment, the current detector comprises a first resistor;

wherein a first end of the first resistor serves as a first end of the current detector and is coupled to the power management IC and a second end of the first resistor serves as a second end of the current detector.

In an embodiment, the operational amplification circuit comprises a second resistor, a third resistor, a fourth resistor, an eighth resistor and an operational amplifier;

wherein a first end of the second resistor serves as a first detecting voltage signal input end of the operational amplification circuit and is connected to the current detector, a second end of the second resistor, a first end of the third resistor and a non-inverting input end of the operational amplifier are connected in common, a second end of the third resistor is grounded, a first end of the fourth resistor serves as a second detecting voltage signal input end of the operational amplification circuit and is connected to the current detector, a second end of the fourth resistor, a first end of the eighth resistor and an inverting input end of the operational amplifier are connected in common, and an output end of the operational amplifier and a second end of the eighth resistor are connected in common as a first voltage signal output terminal of the operational amplification circuit.

In an embodiment, the resistance of the second resistor is the same as the resistance of the third resistor.

In an embodiment, the current-limiting setting circuit comprises:

an voltage divider configured to receive the first voltage signal and output the second voltage signal according to the first voltage signal, wherein the voltage divider is coupled to the current detection circuit; and a resistance circuit configured to receive the second voltage signal and output the second current signal according to the second voltage signal, wherein the resistance circuit is coupled to the voltage divider.

In an embodiment, the voltage divider comprises a reference voltage source, a fifth resistor, a sixth resistor and a seventh resistor;

wherein a first end of the sixth resistor and a first end of the seventh resistor are connected in common as a first voltage signal input end of the voltage divider which is connected to the current detection circuit, a second end of the seventh resistor is grounded, a second end of the sixth resistor and a first end of the fifth resistor are connected in common as a second voltage signal output end of the voltage divider which is connected to the resistance circuit, and a second end of the fifth resistor is connected to the reference voltage source.

In an embodiment, the resistance circuit includes a resistor, and a resistance of the resistor is proportional to a voltage value of the second voltage signal.

In an embodiment, the resistor is a digital resistor.

According to another embodiment of the present application, a current-limiting device comprises:

a boost chip configured to output an current output signal and perform current-limiting control on the current output signal through an internal current-limiting setting circuit in the boost chip;

a power management IC configured to output a first current signal;

a current detection circuit configured to receive the first current signal output from the power management IC and convert the first current signal into a corresponding first voltage signal, wherein the current detection circuit is coupled to the power management IC; and a current-limiting setting circuit configured to receive the first voltage signal and output a second current signal, wherein the second current signal is configured to adjust an internal current-limiting setting value of the internal current-limiting setting circuit and the current-limiting setting circuit is coupled to the current detection circuit and the boost chip.

In an embodiment, the internal current-limiting setting circuit is configured to control the boost chip to stop outputting the current output signal in the case that the current output signal is greater than or equal to the internal current-limiting setting value.

In an embodiment, the current detection circuit comprises:

a current detector configured to detect the first current signal and output a first detection voltage signal and a second detection voltage signal according to the first current signal, wherein the current detector is coupled to the power management IC; and an operational amplification circuit configured to receive the first detection voltage signal and the second detection voltage signal and output the first voltage signal according to the first detection voltage signal and the second detection voltage signal, wherein the operational amplification circuit is coupled to the current detector.

In an embodiment, the current detector comprises a first resistor;

wherein a first end of the first resistor serves as a first end of the current detector and is coupled to the power management IC and a second end of the first resistor serves as a second end of the current detector.

In an embodiment, the operational amplification circuit comprises a second resistor, a third resistor, a fourth resistor, an eighth resistor and an operational amplifier;

wherein a first end of the second resistor serves as a first detecting voltage signal input end of the operational amplification circuit and is connected to the current detector, a second end of the second resistor, a first end of the third resistor and a non-inverting input end of the operational amplifier are connected in common, a second end of the third resistor is grounded, a first end of the fourth resistor serves as a second detecting voltage signal input end of the operational amplification circuit and is connected to the current detector, a second end of the fourth resistor, a first end of the eighth resistor and an inverting input end of the operational amplifier are connected in common, and an output end of the operational amplifier and a second end of the eighth resistor are connected in common as a first voltage signal output terminal of the operational amplification circuit.

In an embodiment, the resistance of the second resistor is the same as the resistance of the third resistor.

In an embodiment, the current-limiting setting circuit comprises:

an voltage divider configured to receive the first voltage signal and output the second voltage signal according to the first voltage signal, wherein the voltage divider is coupled to the current detection circuit; and a resistance circuit configured to receive the second voltage signal and output the second current signal according to the second voltage signal, wherein the resistance circuit is coupled to the voltage divider.

In an embodiment, the voltage divider comprises a reference voltage source, a fifth resistor, a sixth resistor and a seventh resistor;

wherein a first end of the sixth resistor and a first end of the seventh resistor are connected in common as a first voltage signal input end of the voltage divider which is connected to the current detection circuit, a second end of the seventh resistor is grounded, a second end of the sixth resistor and a first end of the fifth resistor are connected in common as a second voltage signal output end of the voltage divider which is connected to the resistance circuit, and a second end of the fifth resistor is connected to the reference voltage source.

In an embodiment, the resistance circuit includes a resistor, and a resistance of the resistor is proportional to a voltage value of the second voltage signal.

According to another embodiment of the present application, a display device comprising:

a display panel;

a driver board; and a current-limiting circuit;

wherein a boost chip is arranged at the driver board, and the display panel is provided with a shift register configured to receive a current output signal output from the boost chip to drive the display panel;

wherein the current-limiting circuit is coupled to the boost chip and the power management IC;

wherein the current-limiting circuit includes:

a current detection circuit configured to receive a first current signal output from the power management IC and convert the first current signal into a corresponding first voltage signal, wherein the current detection circuit is coupled to the power management IC; and a current-limiting setting circuit configured to receive the first voltage signal and output a second current signal for current-limiting control of a current output signal of the boost chip, wherein the current-limiting setting circuit is coupled to the current detection circuit and the boost chip.

Embodiments of the present disclosure provide a current-limiting circuit, a current-limiting device, and a display device. The current-limiting circuit is coupled to a boost chip and a power management IC, the current detection circuit processes the first current signal output from the power management IC and outputs the first voltage signal, and the current-limiting setting circuit processes the first voltage signal and outputs a second current signal to the boost chip, so that the boost chip can set the internal current-limiting setting value according to the first current signal output from the power management IC. Therefore the boost chip and the power management IC can turned off the output currents in time when the output currents of the boost chip and the power management IC are too large, thereby avoiding the display panel being burnt due to overcurrent, and solving the problem that because the overcurrent protection circuits used by the boost chip and the power management IC often cannot turn off the corresponding current output in time, the panel burnout occurs, which has great security risks.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are just some embodiments of the present disclosure, those skilled in the art can also obtain other drawings based on these drawings without paying any creative effort.

DESCRIPTION OF THE EMBODIMENTS

The technical solutions in the embodiments of the present disclosure will be clearly described in the following with reference to the accompanying drawings in the embodiments of the present disclosure. It is obvious that the embodiments to be described are just some instead of all embodiments of the present disclosure. All other embodiments obtained by those skilled in the art based on the embodiments of the present disclosure without paying any creative effort should be included within the protection scope of the present disclosure.

The term "comprise" and its variations in the specification, claims and above description of the drawings of the present disclosure are intended to cover non-exclusive inclusions. For example, a process, method or system, product or device including a series of steps or units is not limited to the listed steps or units, but optionally also includes steps or units not listed, or optionally also includes other steps or units inherent to the process, method, product or equipment. Moreover, the terms "first", "second" and "third," etc. are used to distinguish different objects, and are not intended to describe a particular order.

Figure 1:
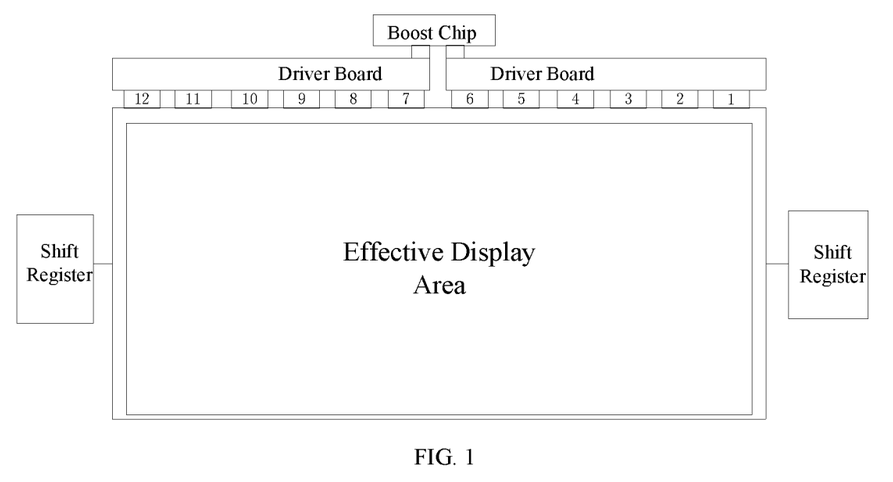
FIG. 1 is a schematic diagram of a display with GDL architecture according to an embodiment of the present disclosure.

FIG. 1 is a schematic diagram of a display with GDL architecture according to an embodiment of the present disclosure. In the GDL architecture, a GDL circuit divides a gate driver chip into a level shifter IC and a shift register. As shown in FIG. 1, the boost chip is integrated on the driver board, and the driver board is connected to the display panel through a plurality of pins, such as pin 1 to pin 12 in FIG. 1. The shift register chip is integrated on the display panel. The driving of the display is implemented by the boost chip outputting a high voltage logic signal to the shift register chip, so that the length of the frame can be reduced and the effective display area on the display panel can be increased.

In an embodiment of the present disclosure, the boost chip and the power management IC are both provided with an overcurrent protection mechanism. The power management IC is configured to convert the voltage output from the power supply into various types of voltage signals, for example, the turn-on voltage signal VGH for turning on the thin film transistor (TFT), the turn-off voltage signal VGL for turning off the TFT, etc. The boost chip is generally configured to convert low voltage logic signals into high voltage logic signals. The overcurrent protection mechanism of the boost chip includes an internal current-limiting setting circuit for current-limiting control of the current output signal of the boost chip. The internal current-limiting setting circuit controls the current output signal according to the internal current-limiting setting value which can be adjusted according to the user's needs. For example, a specific current value can be set by connecting an external resistor via an external pin, the larger the resistance of the external resistor is, the smaller the internal current-limiting setting value is.

Figure 2:
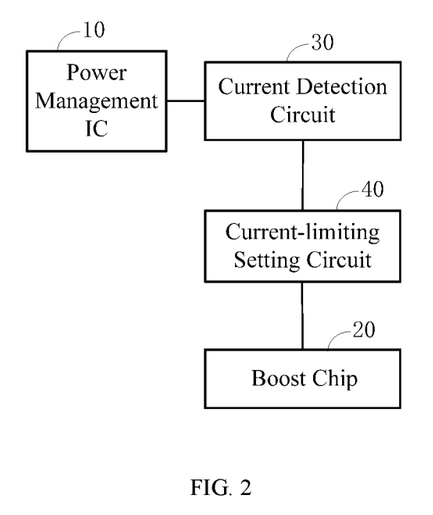
FIG. 2 is a schematic diagram of a current-limiting circuit according to an embodiment of the present disclosure.

FIG. 2 is a schematic diagram of a current-limiting circuit according to an embodiment of the present disclosure.

As shown in FIG. 2, the current-limiting circuit according to this embodiment is connected to the boost chip 20 and the power management IC 10 respectively. The current-limiting circuit includes a current detection circuit 30 and a current-limiting setting circuit 40.

The current detection circuit 30 is configured to receive a first current signal output from the power management IC and to convert the first current signal into a corresponding first voltage signal. The current detection circuit is coupled the power management IC.

The current-limiting setting circuit 40 is configured to receive the first voltage signal and to output a second current signal for current-limiting control of the current output signal of the boost chip. The current-limiting setting circuit is coupled to the current detection circuit and the boost chip.

In an embodiment, the current detection circuit 30 detects the first current signal output from the power management IC 10 and outputs the corresponding first voltage signal according to the first current signal, and the current-limiting setting circuit 40 generates the second current signal for adjusting an internal current limit setting value of the boost chip 20 according to the first voltage signal. For example, when the first current signal output from the power management IC 10 is excessive, the first voltage signal output from the current detection circuit 30 according to the first current signal is also increased. Meanwhile, the second current signal generated by the current-limiting setting circuit 40 according to the first voltage signal controls the internal current-limiting setting value of the boost chip 20 to be lowered, so that the overcurrent shutdown value of the boost chip 20 is lowered when the first current signal output from the power management IC 10 is excessively large, where the overcurrent shutdown value is the internal current-limiting setting value of the boost chip 20, thus the effect that both the power management IC 10 and the boost chip 20 turn off the output currents when the output currents are too large can be reached.

In one embodiment, the boost chip 20 includes an internal current-limiting setting circuit.

The internal current-limiting setting circuit is configured to control the boost chip to stop outputting the current output signal when the current output signal is greater than or equal to the internal current-limiting setting value.

In this embodiment, the boost chip 20 is internally provided with an internal current-limiting setting circuit, and the internal current-limiting setting circuit generates an internal current-limiting setting value. When the high voltage logic signal output from the boost chip 20 exceeds the internal current-limiting setting value the boost chip 20 stops outputting the high voltage logic signal.

In one embodiment, the internal current limit setting value of the boost chip 20 can be set and adjusted as desired.

Figure 3:
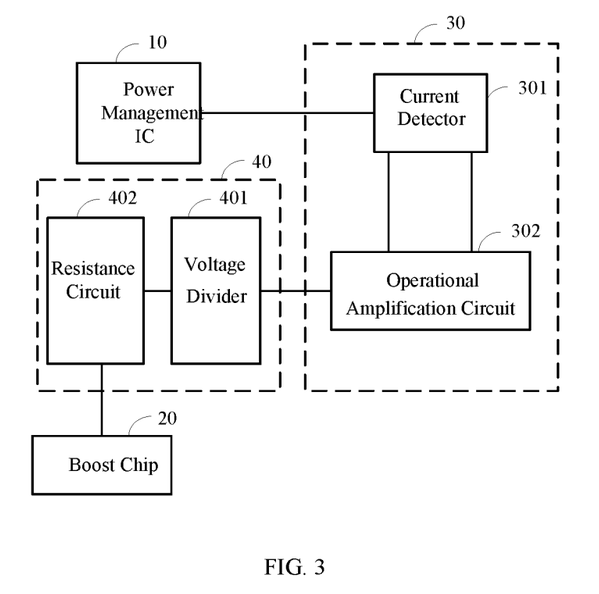
FIG. 3 is a schematic diagram of a current-limiting circuit according to another embodiment of the present disclosure.

FIG. 3 is a schematic diagram of a current-limiting circuit according to another embodiment of the present disclosure.

As shown in FIG. 3, the current detection circuit 30 includes a current detector 301 and an operational amplification circuit 302.

The current detector 301 is configured to detect the first current signal and output a first detection voltage signal and a second detection voltage signal according to the first current signal. The current detector 301 is coupled to the power management IC 10.

The operational amplification circuit 302 is configured to receive the first detection voltage signal and the second detection voltage signal and output the first voltage signal according to the first detection voltage signal and the second detection voltage signal. The operational amplification circuit 302 is coupled to the current detector 301.

In an embodiment, the resistance value of the current detector 301 may be set to a preset resistance value according to the user's need, and the operational amplification circuit 302 may acquire the current value of the first current signal output from the power management IC 10 based on the first and second detection voltage signals output from the current detector 301 and the resistance value of the current detector 301 preset by the user and output a corresponding first voltage signal.

Figure 4:
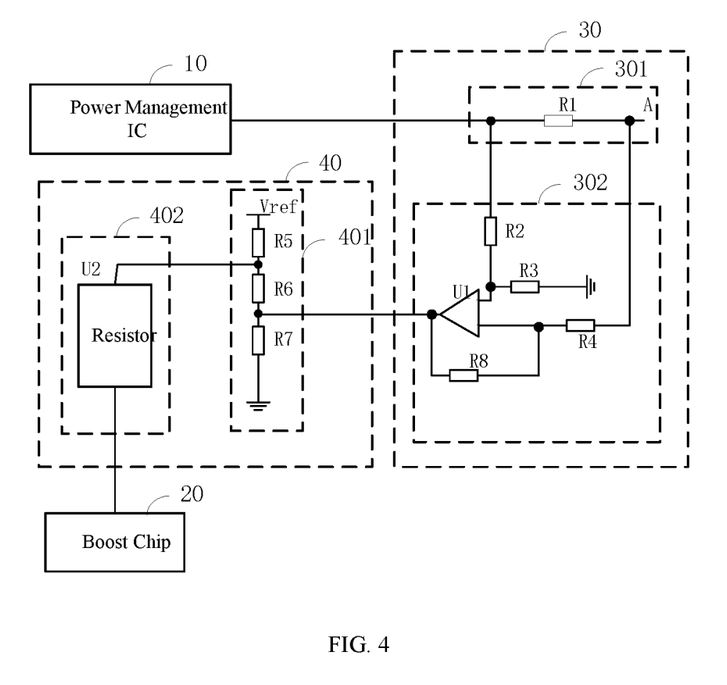
FIG. 4 is a schematic diagram of a current-limiting circuit according to another embodiment of the present disclosure.

FIG. 4 is a schematic diagram of a current-limiting circuit according to another embodiment of the present disclosure.

Referring to FIG. 4, the current detector 301 includes a first resistor R1.

Specifically, a first end of the first resistor R1 serves as a first end of the current detector 301 and is coupled to the power management IC 10 and a second end of the first resistor R1 serves as a second end of the current detector 301. In this embodiment, the first end of the first resistor R1 outputs the first detection voltage signal and the second end of the first resistor R1 outputs the second detection voltage signal.

In an embodiment, the first resistor R1 may be a sensing resistor, and the resistance of the sensing resistor may vary according to the magnitude of the current value. Meanwhile, the first end and the second end of the sensing resistor respectively serve as the first end and the second end of the current detector 301.

In an embodiment, referring to FIG. 4, the operational amplification circuit 302 includes a second resistor R2, a third resistor R3, a fourth resistor R4, an eighth resistor R8 and an operational amplifier U1.

Specifically, a first end of the second resistor R2 serves as a first detecting voltage signal input end of the operational amplification circuit 301 and is connected to the current detector 301, a second end of the second resistor R2, a first end of the third resistor R3 and a non-inverting input end (+) of the operational amplifier U1 are connected in common, a second end of the third resistor R3 is grounded, a first end of the fourth resistor R4 serves as a second detecting voltage signal input end of the operational amplification circuit 302 and is connected to the current detector 301, a second end of the fourth resistor R4, a first end of the eighth resistor R8 and an inverting input end of the operational amplifier U1 are connected in common, and an output end of the operational amplifier U1 and a second end of the eighth resistor R8 are connected in common as a first voltage signal output terminal of the operational amplification circuit 302.

In an embodiment, the resistance of the second resistor R2 is the same as the resistance of the third resistor R3.

In an embodiment, the output signal of the operational amplifier U1 is proportional to the signal voltage difference between the two input ends of the operational amplifier, that is, the output voltage $Vout=A0*(V+-V-)$. Specifically, $V+$ is the voltage of the input signal of the non-inverting input end of the operational amplifier U1, $V-$ is the voltage of the input signal of the inverting input end, and $A0$ is the low frequency gain of the operational amplifier U1.

In an embodiment, assuming that the voltage value of the first detection voltage signal of the first end of the first resistor R1 is V1, the voltage value of the second detection voltage signal is V2, the low frequency gain of the operational amplifier U1 is 1, that is, $A0=1$, the voltage signal input to the non-inverting input end of the operational amplifier U1 is obtained by dividing the first detection voltage signal by the second resistor R2 and the third resistor R3, wherein the voltage values of the second resistor R2 and the third resistor R3 are the same and the resistance values of the fourth resistor R4 and the eighth resistor R8 are the same, the voltage signal $V+$ input to the non-inverting input end of the operational amplifier U1 satisfies $V+=(V1)/2$, and the voltage signal $V-$ input to the inverting input end of the operational amplifier U1 satisfies $V-=V2-(V2-Vout)/2=(V2+Vout)/2$. As the operational amplifier has the characteristics of $V+=V-$, there is $(V1)/2=(V2+Vout)/2$, i.e., $V1=V2+Vout$, therefore, $Vout=V1-V2$, where Vout is the voltage difference between V1 and V2.

In an embodiment, referring to FIG. 3, the current-limiting setting circuit 40 includes a voltage divider 401 and a resistance circuit 402.

The voltage divider 401 is configured to receive the first voltage signal and output the second voltage signal according to the first voltage signal. The voltage divider 401 is coupled to the current detection circuit 30.

The resistance circuit 402 is configured to receive the second voltage signal and output the second current signal according to the second voltage signal. The resistance circuit 402 is coupled to the voltage divider 401.

In an embodiment, referring to FIG. 4, the voltage divider 401 includes a reference voltage source Vref, a fifth resistor R5, a sixth resistor R6, and a seventh resistor R7.

Specifically, a first end of the sixth resistor R6 and a first end of the seventh resistor R7 are connected in common as a first voltage signal input end of the voltage divider 401 which is connected to the current detection circuit 30, a second end of the seventh resistor R7 is grounded, a second end of the sixth resistor R6 and a first end of the fifth resistor R5 are connected in common as a second voltage signal output end of the voltage divider 401 which is connected to the resistance circuit 402, and a second end of the fifth resistor R5 is connected to the reference voltage source Vref.

In an embodiment, the reference voltage source Vref is divided by the fifth resistor R5, the sixth resistor R6, and the seventh resistor R7, and the output end of the operational amplifier U1 is connected between the sixth resistor R6 and the seventh resistor R7. That is, the voltage value of the first voltage signal received by the voltage divider 401 is Vout. Assuming that the voltage value of the second voltage signal output from the voltage divider 401 according to the first voltage signal is Vs, the resistance of the fifth resistor R5 is R5 and the resistance of the sixth resistor R6 is R6, there is Vs=(R6*Vref+Vout*R5)/(R5+R6), that is, the voltage value Vs of the second voltage signal is proportional to the voltage value Vout of the first voltage signal.

In an embodiment, referring to FIG. 4, the resistance circuit 402 is a resistor U2, and the resistance of the resistor U2 is proportional to the voltage value of the second voltage signal.

In an embodiment, the second voltage signal serves as the operating power of the resistor U2, and the resistance of the resistor U2 is proportional to the voltage value Vs of the second voltage signal. The larger the voltage value Vs of the second voltage signal is, the larger the resistance value of the resistor U2 is. Therefore, by changing the voltage value Vs of the second voltage signal, the resistance value of the resistor U2 can be changed, thereby changing the current value of the second current signal, so as to change the internal current-limiting setting value of the boost chip 20.

In an embodiment, the resistor U2 may be a digital resistor, which is a digitally adjustable resistor whose resistance value is proportional to the voltage value of the received voltage signal, that is, the larger the voltage value of the received voltage signal is, the larger the resistance value of the digital resistor is.

In an embodiment, when the first current signal output from the power management IC increases, the voltage value Vout of the first voltage signal output from the current detection circuit 30 increases, and the voltage value Vs of the second voltage signal output from the voltage divider 401 and the resistance value of the resistor U2 also increase. Therefore, the internal current-limiting setting value of the boost chip 20 is lowered. The internal current-limiting setting value is the overcurrent shutdown value of the boost chip 20, that is, when the current of the high voltage logic signal outputted by the boost chip 20 reaches the overcurrent shutdown value the output is turned off, thus the effect that both the power management IC 10 and the boost chip 20 turn off the output currents when the output currents are too large can be reached.

Figure 5:
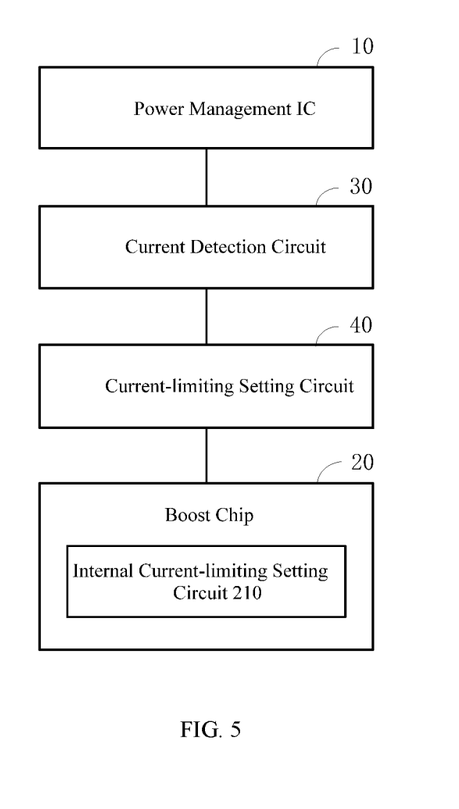
FIG. 5 is a schematic diagram of a current-limiting device according to an embodiment of the present disclosure.

FIG. 5 is a schematic diagram of a current-limiting device according to an embodiment of the present disclosure.

As shown in FIG. 5, the current-limiting device according to this embodiment includes a boost chip 20, a power management IC 10, a current detection circuit 30 and a current-limiting setting circuit 40.

The boost chip 20 is configured to output a current output signal and perform current-limiting control on the current output signal through an internal current-limiting setting circuit 210 in the boost chip 20.

The power management IC 10 is configured to output a first current signal.

The current detection circuit 30 is configured to receive the first current signal output from the power management IC and to convert the first current signal into a corresponding first voltage signal. The current detection circuit 30 is coupled to the power management IC 10.

The current-limiting setting circuit 40 is configured to receive the first voltage signal and output a second current signal. The second current signal is configured to adjust an internal current-limiting setting value of the internal current-limiting setting circuit 210 and the current-limiting setting circuit 40 is coupled to the current detection circuit 30 and the boost chip 20.

In an embodiment, the internal current-limiting setting circuit 210 is configured to control the boost chip to stop outputting the current output signal when the current output signal is greater than or equal to the internal current-limiting setting value.

In an embodiment, the internal current-limiting setting circuit 210 performs current-limiting control on the current output signal of the boost chip 20 by using an internal current-limiting setting value which is set according to the second current signal. In the present embodiment, the current value of the second current signal is inversely proportional to the resistance value of the resistor U2. When the resistance value of the resistor U2 is larger, the current value of the second current signal is smaller, and the internal current-limiting setting value of the internal current-limiting module is smaller, that is, the shutdown current of the boost chip 20 can be smaller.

In an embodiment, the current detection circuit 30 detects the first current signal output from the power management IC 10 and outputs the corresponding first voltage signal according to the first current signal, and the current-limiting setting circuit 40 generates the second current signal for adjusting an internal current limit setting value of the boost chip 20 according to the first voltage signal. For example, when the first current signal output from the power management IC 10 is excessive, the first voltage signal output from the current detection circuit 30 according to the first current signal is also increased. Meanwhile, the second current signal generated by the current-limiting setting circuit 40 according to the first voltage signal controls the internal current-limiting setting value of the boost chip 20 to be lowered, so that the overcurrent shutdown value of the boost chip 20 is lowered when the first current signal output from the power management IC 10 is excessively large, where the overcurrent shutdown value is the internal current-limiting setting value of the boost chip 20, thus the effect that both the power management IC 10 and the boost chip 20 turn off the output currents when the output currents are too large can be reached.

In an embodiment, referring to FIG. 3, the current detection circuit 30 includes a current detector 301 and an operational amplification circuit 302.

The current detector 301 is configured to detect the first current signal and output a first detection voltage signal and a second detection voltage signal according to the first current signal. The current detector 301 is coupled to the power management IC 10.

The operational amplification circuit 302 is configured to receive the first detection voltage signal and the second detection voltage signal and output the first voltage signal according to the first detection voltage signal and the second detection voltage signal. The operational amplification circuit 302 is coupled to the current detector 301.

In an embodiment, the resistance value of the current detector 301 may be set to a preset resistance value according to the user's need, and the operational amplification circuit 302 may acquire the current value of the first current signal output from the power management IC 10 based on the first and second detection voltage signals output from the current detector 301 and the resistance value of the current detector 301 preset by the user and output a corresponding first voltage signal.

In an embodiment, referring to FIG. 4, the current detector 301 includes a first resistor R1.

Specifically, a first end of the first resistor R1 serves as a first end of the current detector 301 and is coupled to the power management IC 10 and a second end of the first resistor R1 serves as a second end of the current detector 301. In this embodiment, the first end of the first resistor R1 outputs the first detection voltage signal and the second end of the first resistor R1 outputs the second detection voltage signal.

In an embodiment, the first resistor R1 may be a sensing resistor, and the resistance of the sensing resistor may vary according to the magnitude of the current value. Meanwhile, the first end and the second end of the sensing resistor respectively serve as the first end and the second end of the current detector 301.

In an embodiment, referring to FIG. 4, the operational amplification circuit 302 includes a second resistor R2, a third resistor R3, a fourth resistor R4, an eighth resistor R8 and an operational amplifier U1.

Specifically, a first end of the second resistor R2 serves as a first detecting voltage signal input end of the operational amplification circuit 302 and is connected to the current detector 301, a second end of the second resistor R2, a first end of the third resistor R3 and a non-inverting input end (+) of the operational amplifier U1 are connected in common, a second end of the third resistor R3 is grounded, a first end of the fourth resistor R4 serves as a second detecting voltage signal input end of the operational amplification circuit 302 and is connected to the current detector 301, a second end of the fourth resistor R4, a first end of the eighth resistor R8 and an inverting input end of the operational amplifier U1 are connected in common, and an output end of the operational amplifier U1 and a second end of the eighth resistor R8 are connected in common as a first voltage signal output terminal of the operational amplification circuit 302.

In an embodiment, the resistance of the second resistor R2 is the same as the resistance of the third resistor R3.

In an embodiment, the output signal of the operational amplifier U1 is proportional to the signal voltage difference between the two input ends of the operational amplifier, that is, the output voltage Vout=A0*(V+−V−). Specifically, V+ is the voltage of the input signal of the non-inverting input end of the operational amplifier U1, V− is the voltage of the input signal of the inverting input end, and A0 is the low frequency gain of the operational amplifier U1.

In an embodiment, assuming that the voltage value of the first detection voltage signal of the first end of the first resistor R1 is V1, the voltage value of the second detection voltage signal is V2, the low frequency gain of the operational amplifier U1 is 1, that is, A0=1, the voltage signal input to the non-inverting input end of the operational amplifier U1 is obtained by dividing the first detection voltage signal by the second resistor R2 and the third resistor R3, wherein the voltage values of the second resistor R2 and the third resistor R3 are the same and the resistance values of the fourth resistor R4 and the eighth resistor R8 are the same, the voltage signal V+ input to the non-inverting input end of the operational amplifier U1 satisfies V+=(V1)/2, and the voltage signal V− input to the inverting input end of the operational amplifier U1 satisfies V−=V2−(V2−Vout)/2= (V2+Vout)/2. As the operational amplifier has the characteristics of V+=V−, there is (V1)/2=(V2+Vout)/2, i.e., V1=V2+Vout, therefore, Vout=V1−V2, where Vout is the voltage difference between V1 and V2.

In an embodiment, referring to FIG. 3, the current-limiting setting circuit 40 includes a voltage divider 401 and a resistance circuit 402.

The voltage divider 401 is configured to receive the first voltage signal and output the second voltage signal according to the first voltage signal. The voltage divider 401 is coupled to the current detection circuit 30.

The resistance circuit 402 is configured to receive the second voltage signal and output the second current signal according to the second voltage signal. The resistance circuit 402 is coupled to the voltage divider 401.

In an embodiment, referring to FIG. 4, the voltage divider 401 includes a reference voltage source Vref, a fifth resistor R5, a sixth resistor R6, and a seventh resistor R7.

Specifically, a first end of the sixth resistor R6 and a first end of the seventh resistor R7 are connected in common as a first voltage signal input end of the voltage divider 401 which is connected to the current detection circuit 30, a second end of the seventh resistor R7 is grounded, a second end of the sixth resistor R6 and a first end of the fifth resistor R5 are connected in common as a second voltage signal output end of the voltage divider 401 which is connected to the resistance circuit 402, and a second end of the fifth resistor R5 is connected to the reference voltage source Vref.

In an embodiment, the reference voltage source Vref is divided by the fifth resistor R5, the sixth resistor R6, and the seventh resistor R7, and the output end of the operational amplifier U1 is connected between the sixth resistor R6 and the seventh resistor R7. That is, the voltage value of the first voltage signal received by the voltage divider 401 is Vout. Assuming that the voltage value of the second voltage signal output from the voltage divider 401 according to the first voltage signal is Vs, the resistance of the fifth resistor R5 is R5 and the resistance of the sixth resistor R6 is R6, there is Vs=(R6*Vref+Vout*R5)/(R5+R6), that is, the voltage value Vs of the second voltage signal is proportional to the voltage value Vout of the first voltage signal.

In an embodiment, referring to FIG. 4, the resistance circuit 402 includes a resistor U2, and the resistance of the resistor U2 is proportional to the voltage value of the second voltage signal.

In an embodiment, the second voltage signal serves as the operating power of the resistor U2, and the resistance of the resistor U2 is proportional to the voltage value Vs of the second voltage signal. The larger the voltage value Vs of the second voltage signal is, the larger the resistance value of the resistor U2 is. Therefore, by changing the voltage value Vs of the second voltage signal, the resistance value of the resistor U2 can be changed, thereby changing the current value of the second current signal, so as to change the internal current-limiting setting value of the boost chip 20.

In an embodiment, the resistor U2 may be a digital resistor, which is a digitally adjustable resistor whose resistance value is proportional to the voltage value of the received voltage signal, that is, the larger the voltage value of the received voltage signal is, the larger the resistance value of the digital resistor is.

In an embodiment, when the first current signal output from the power management IC increases, the voltage value Vout of the first voltage signal output from the current detection circuit 30 increases, and the voltage value Vs of the second voltage signal output from the voltage divider 401 and the resistance value of the resistor U2 also increase. Therefore, the internal current-limiting setting value of the boost chip 20 is lowered. The internal current-limiting setting value is the overcurrent shutdown value of the boost chip 20, that is, when the current of the high voltage logic signal outputted by the boost chip 20 reaches the overcurrent shutdown value the output is turned off, thus the effect that both the power management IC 10 and the boost chip 20 turn off the output current when the output current is too high can be reached.

An embodiment of the present disclosure provides a display device which includes a display panel, a driver board and a current-limiting circuit.

A boost chip 20 is arranged at the driver board. The display panel is provided with a shift register configured to receive a current output signal output from the boost chip to drive the display panel.

The current-limiting circuit is coupled to the boost chip and the power management IC 10.

In this embodiment the current-limiting circuit may be referred to in FIG. 2. As shown in FIG. 2, the current-limiting circuit includes a current detection circuit 30 and a current-limiting setting circuit 40.

The current detection circuit 30 is configured to receive a first current signal output from the power management IC and to convert the first current signal into a corresponding first voltage signal. The current detection circuit is coupled to the power management IC.

The current-limiting setting circuit 40 is configured to receive the first voltage signal and output a second current signal for current-limiting control of a current output signal of the boost chip. The current-limiting setting circuit is coupled to the current detection circuit and the boost chip.

In an embodiment, the current detection circuit 30 detects the first current signal output from the power management IC 10 and outputs the corresponding first voltage signal according to the first current signal, and the current-limiting setting circuit 40 generates the second current signal for adjusting an internal current limit setting value of the boost chip 20 according to the first voltage signal. For example, when the first current signal output from the power management IC 10 is excessive, the first voltage signal output from the current detection circuit 30 according to the first current signal is also increased. Meanwhile, the second current signal generated by the current-limiting setting circuit 40 according to the first voltage signal controls the internal current-limiting setting value of the boost chip 20 to be lowered, so that the overcurrent shutdown value of the boost chip 20 is lowered when the first current signal output from the power management IC 10 is excessively large, where the overcurrent shutdown value is the internal current-limiting setting value of the boost chip 20, thus the effect that both the power management IC 10 and the boost chip 20 turn off the output currents when the output currents are too large can be reached.

In an embodiment, the boost chip 20 includes an internal current-limiting setting circuit.

The internal current-limiting setting circuit is configured to control the boost chip to stop outputting the current output signal when the current output signal is greater than or equal to the internal current-limiting setting value.

In this embodiment, the boost chip 20 is internally provided with an internal current-limiting setting circuit, and the internal current-limiting setting circuit generates an internal current-limiting setting value. When the high voltage logic signal output from the boost chip 20 exceeds the internal current-limiting setting value the boost chip 20 stops outputting the high voltage logic signal.

In an embodiment, the internal current limit setting value of the boost chip 20 may be set and adjusted as desired.

The above description is only some embodiments of the present disclosure, and is not intended to limit the present disclosure. Any modifications, equivalent substitutions and improvements made within the spirit and principles of the present disclosure are included in the protection scope of the present disclosure.

What is claimed is:

1. A current-limiting circuit configured to be coupled to a boost chip and a power management IC, wherein the current-limiting circuit comprises:
   a current detection circuit configured to receive a first current signal output from the power management IC and convert the first current signal into a corresponding first voltage signal, wherein the current detection circuit is coupled to the power management IC; and
   a current-limiting setting circuit configured to receive the first voltage signal and output a second current signal for current-limiting control of a current output signal of the boost chip, wherein the current-limiting setting circuit is coupled to the current detection circuit and the boost chip;
   wherein the boost chip comprises an internal current-limiting setting circuit for controlling the boost chip to stop outputting the current output signal in the case that the current output signal is greater than or equal to an internal current-limiting setting value.

2. The current-limiting circuit of claim 1, wherein the current detection circuit comprises:
   a current detector configured to detect the first current signal and output a first detection voltage signal and a second detection voltage signal according to the first current signal, wherein the current detector is coupled to the power management IC; and
   an operational amplification circuit configured to receive the first detection voltage signal and the second detection voltage signal and output the first voltage signal according to the first detection voltage signal and the second detection voltage signal, wherein the operational amplification circuit is coupled to the current detector.

3. The current-limiting circuit of claim 2, wherein the current detector comprises a first resistor;
   wherein a first end of the first resistor serves as a first end of the current detector and is coupled to the power management IC and a second end of the first resistor serves as a second end of the current detector.

4. The current-limiting circuit of claim 2, wherein the operational amplification circuit comprises a second resistor, a third resistor, a fourth resistor, an eighth resistor and an operational amplifier;
   wherein a first end of the second resistor serves as a first detecting voltage signal input end of the operational amplification circuit and is connected to the current detector, a second end of the second resistor, a first end of the third resistor and a non-inverting input end of the operational amplifier are connected in common, a second end of the third resistor is grounded, a first end of the fourth resistor serves as a second detecting voltage signal input end of the operational amplification circuit and is connected to the current detector, a second end of the fourth resistor, a first end of the eighth resistor and an inverting input end of the operational amplifier are connected in common, and an output end of the operational amplifier and a second end of the eighth resistor are connected in common as a first voltage signal output terminal of the operational amplification circuit.

5. The current-limiting circuit of claim 4, wherein the resistance of the second resistor is the same as the resistance of the third resistor.

6. The current-limiting circuit of claim 1, wherein the current-limiting setting circuit comprises:
- a voltage divider configured to receive the first voltage signal and output the second voltage signal according to the first voltage signal, wherein the voltage divider is coupled to the current detection circuit; and
- a resistance circuit configured to receive the second voltage signal and output the second current signal according to the second voltage signal, wherein the resistance circuit is coupled to the voltage divider.

7. The current-limiting circuit of claim 6, wherein the voltage divider comprises a reference voltage source, a fifth resistor, a sixth resistor and a seventh resistor;
- wherein a first end of the sixth resistor and a first end of the seventh resistor are connected in common as a first voltage signal input end of the voltage divider which is connected to the current detection circuit, a second end of the seventh resistor is grounded, a second end of the sixth resistor and a first end of the fifth resistor are connected in common as a second voltage signal output end of the voltage divider which is connected to the resistance circuit, and a second end of the fifth resistor is connected to the reference voltage source.

8. The current-limiting circuit of claim 6, wherein the resistance circuit includes a resistor, and a resistance of the resistor is proportional to a voltage value of the second voltage signal.

9. The current-limiting circuit of claim 8, wherein the resistor is a digital resistor.

10. A current-limiting device, comprising:
- a boost chip configured to output a current output signal and perform current-limiting control on the current output signal through an internal current-limiting setting circuit in the boost chip;
- a power management IC configured to output a first current signal; a current detection circuit configured to receive the first current signal output from the power management IC and convert the first current signal into a corresponding first voltage signal, wherein the current detection circuit is coupled to the power management IC; and
- a current-limiting setting circuit configured to receive the first voltage signal and output a second current signal, wherein the second current signal is configured to adjust an internal current-limiting setting value of the internal current-limiting setting circuit and the current-limiting setting circuit is coupled to the current detection circuit and the boost chip;
- wherein the internal current-limiting setting circuit controls the boost chip to stop outputting the current output signal in the case that the current output signal is greater than or equal to the internal current-limiting setting value.

11. The current-limiting device of claim 10, wherein the current detection circuit comprises:
- a current detector configured to detect the first current signal and output a first detection voltage signal and a second detection voltage signal according to the first current signal, wherein the current detector is coupled to the power management IC; and
- an operational amplification circuit configured to receive the first detection voltage signal and the second detection voltage signal and output the first voltage signal according to the first detection voltage signal and the second detection voltage signal, wherein the operational amplification circuit is coupled to the current detector.

12. The current-limiting device of claim 11, wherein the current detector comprises a first resistor;
- wherein a first end of the first resistor serves as a first end of the current detector and is coupled to the power management IC and a second end of the first resistor serves as a second end of the current detector.

13. The current-limiting device of claim 11, wherein the operational amplification circuit comprises a second resistor, a third resistor, a fourth resistor, an eighth resistor and an operational amplifier;
- wherein a first end of the second resistor serves as a first detecting voltage signal input end of the operational amplification circuit and is connected to the current detector, a second end of the second resistor, a first end of the third resistor and a non-inverting input end of the operational amplifier are connected in common, a second end of the third resistor is grounded, a first end of the fourth resistor serves as a second detecting voltage signal input end of the operational amplification circuit and is connected to the current detector, a second end of the fourth resistor, a first end of the eighth resistor and an inverting input end of the operational amplifier are connected in common, and an output end of the operational amplifier and a second end of the eighth resistor are connected in common as a first voltage signal output terminal of the operational amplification circuit.

14. The current-limiting device of claim 13, wherein the resistance of the second resistor is the same as the resistance of the third resistor.

15. The current-limiting device of claim 10, wherein the current-limiting setting circuit comprises:
- a voltage divider configured to receive the first voltage signal and output the second voltage signal according to the first voltage signal, wherein the voltage divider is coupled to the current detection circuit; and
- a resistance circuit configured to receive the second voltage signal and output the second current signal according to the second voltage signal, wherein the resistance circuit is coupled to the voltage divider.

16. The current-limiting device of claim 15, wherein the voltage divider comprises a reference voltage source, a fifth resistor, a sixth resistor and a seventh resistor;
- wherein a first end of the sixth resistor and a first end of the seventh resistor are connected in common as a first voltage signal input end of the voltage divider which is connected to the current detection circuit, a second end of the seventh resistor is grounded, a second end of the sixth resistor and a first end of the fifth resistor are connected in common as a second voltage signal output end of the voltage divider which is connected to the resistance circuit, and a second end of the fifth resistor is connected to the reference voltage source.

17. The current-limiting device of claim 15, wherein the resistance circuit includes a resistor, and a resistance of the resistor is proportional to a voltage value of the second voltage signal.

18. A display device, comprising:
- a display panel;
- a driver board; and
- a current-limiting circuit;
- wherein a boost chip is arranged at the driver board, and the display panel is provided with a shift register configured to receive a current output signal output from the boost chip to drive the display panel;
- wherein the current-limiting circuit is coupled to the boost chip and the power management IC;

wherein the current-limiting circuit includes:
a current detection circuit configured to receive a first current signal output from the power management IC and convert the first current signal into a corresponding first voltage signal, wherein the current detection circuit is coupled to the power management IC; and
a current-limiting setting circuit configured to receive the first voltage signal and output a second current signal for current-limiting control of a current output signal of the boost chip, wherein the current-limiting setting circuit is coupled to the current detection circuit and the boost chip;
wherein the boost chip comprises an internal current-limiting setting circuit for controlling the boost chip to stop outputting the current output signal in the case that the current output signal is greater than or equal to an internal current-limiting setting value.

* * * * *